US006176320B1

(12) United States Patent
Lopez

(10) Patent No.: US 6,176,320 B1
(45) Date of Patent: Jan. 23, 2001

(54) METHOD AND APPARATUS FOR PRECISION PLANTING, WEEDING, AND CULTIVATION OF CROPS/ A METRIC WALKING TRACTOR

(76) Inventor: Gilbert Lopez, P.O. Box 1454, Longmont, CO (US) 80502

( * ) Notice: Under 35 U.S.C. 154(b), the term of this patent shall be extended for 0 days.

(21) Appl. No.: 09/239,207

(22) Filed: Jan. 28, 1999

(51) Int. Cl.⁷ ..................................................... A01B 49/04
(52) U.S. Cl. ................................. 172/2; 172/42; 172/43; 172/256; 701/50
(58) Field of Search ............................. 172/42, 256, 43, 172/50, 2; 701/50; 111/200

(56) References Cited

U.S. PATENT DOCUMENTS

| 4,237,983 | * | 12/1980 | Allen | 172/42 |
| 4,286,670 | * | 9/1981 | Ackerman | 172/42 |
| 4,351,396 | * | 9/1982 | Moulton | 172/40 |
| 4,621,697 | * | 11/1986 | Webb | 172/42 |
| 4,719,974 | * | 1/1988 | Kanai et al. | 172/43 X |
| 4,807,131 | * | 2/1989 | Clegg | 172/4.5 X |
| 5,316,101 | * | 5/1994 | Gannon | 180/221 |
| 5,441,116 | * | 8/1995 | Rodriguez | 172/42 X |
| 5,520,253 | * | 5/1996 | Kesting | 172/42 X |
| 5,713,420 | * | 2/1998 | Roberts et al. | 172/42 |
| 5,743,347 | * | 4/1998 | Gingerich | 180/65.1 |

* cited by examiner

Primary Examiner—Christopher J. Novosad

(57) ABSTRACT

The instant invention is particularly intended for gardening and small truck farming operations consisting of a method and apparatus which provides for accurate planting of seed in rows and is, by this embodiment, able to repeat it's travel in the row to perform subsequent tasks such as in-the-row weeding, cultivating and other operations as desired. To achieve these goals, the machine which can also be called a metric walking tractor is comprised of a solid frame, encoded motor, batteries, direct coupled worm drive, high traction wheels, drive and control circuitry and universal tool holder with electromechanical power available to the ground conditioning tools as needed. The named machine is also constructed to incorporate traditional tools such as plows, cultivators, weed scrapers and more. To further enhance the usability of the apparatus, an on-board solar panel is included with a special drive circuit which can switch the batteries from parrallel for charging to series for running the motor and control circuit.

3 Claims, 5 Drawing Sheets

FUNCTIONAL DIAGRAM OF METRIC DRIVE SYSTEM

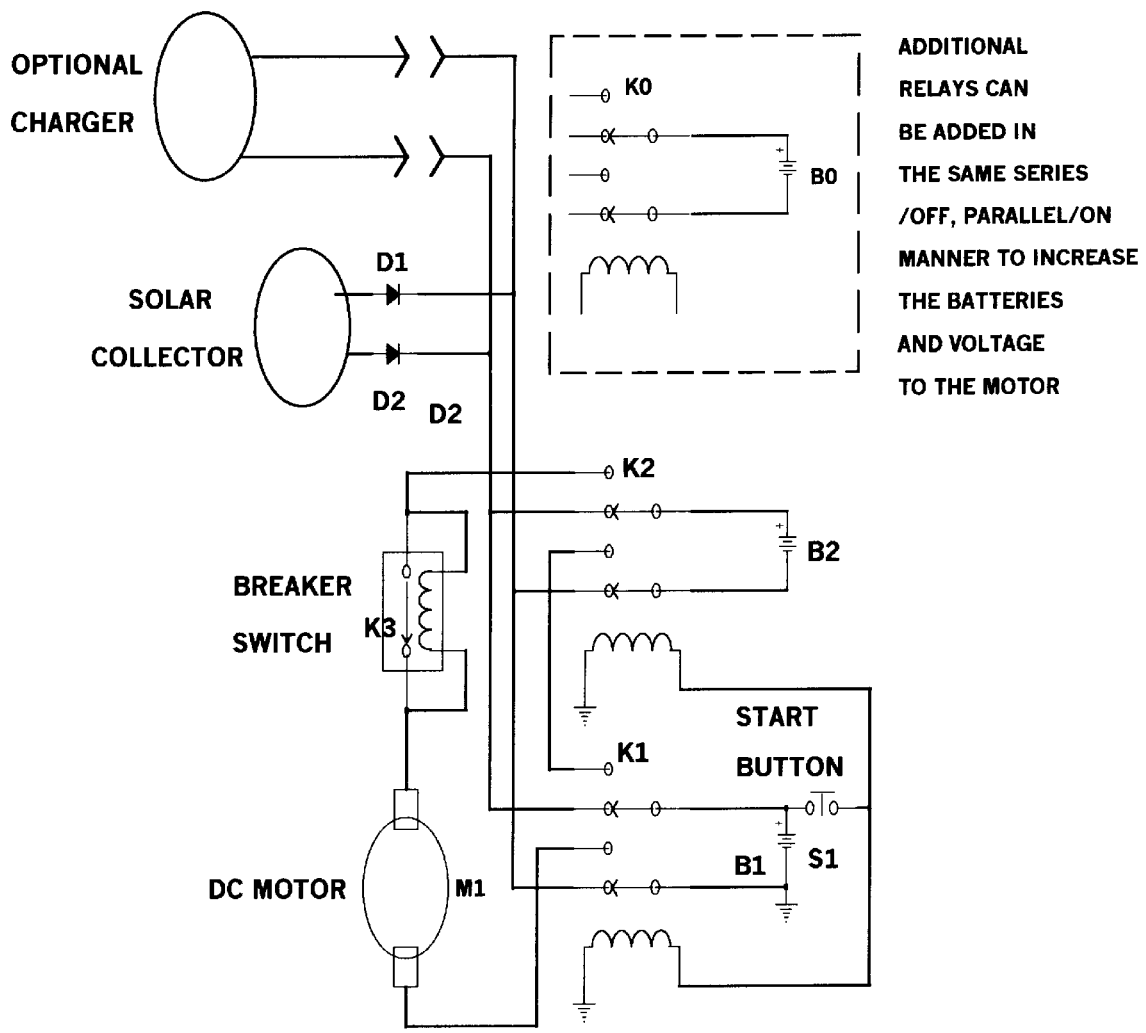
FIG 4. SCHEMATIC OF DRIVE/CHARGE CIRCUIT FOR METRIC WALKING TRACTOR

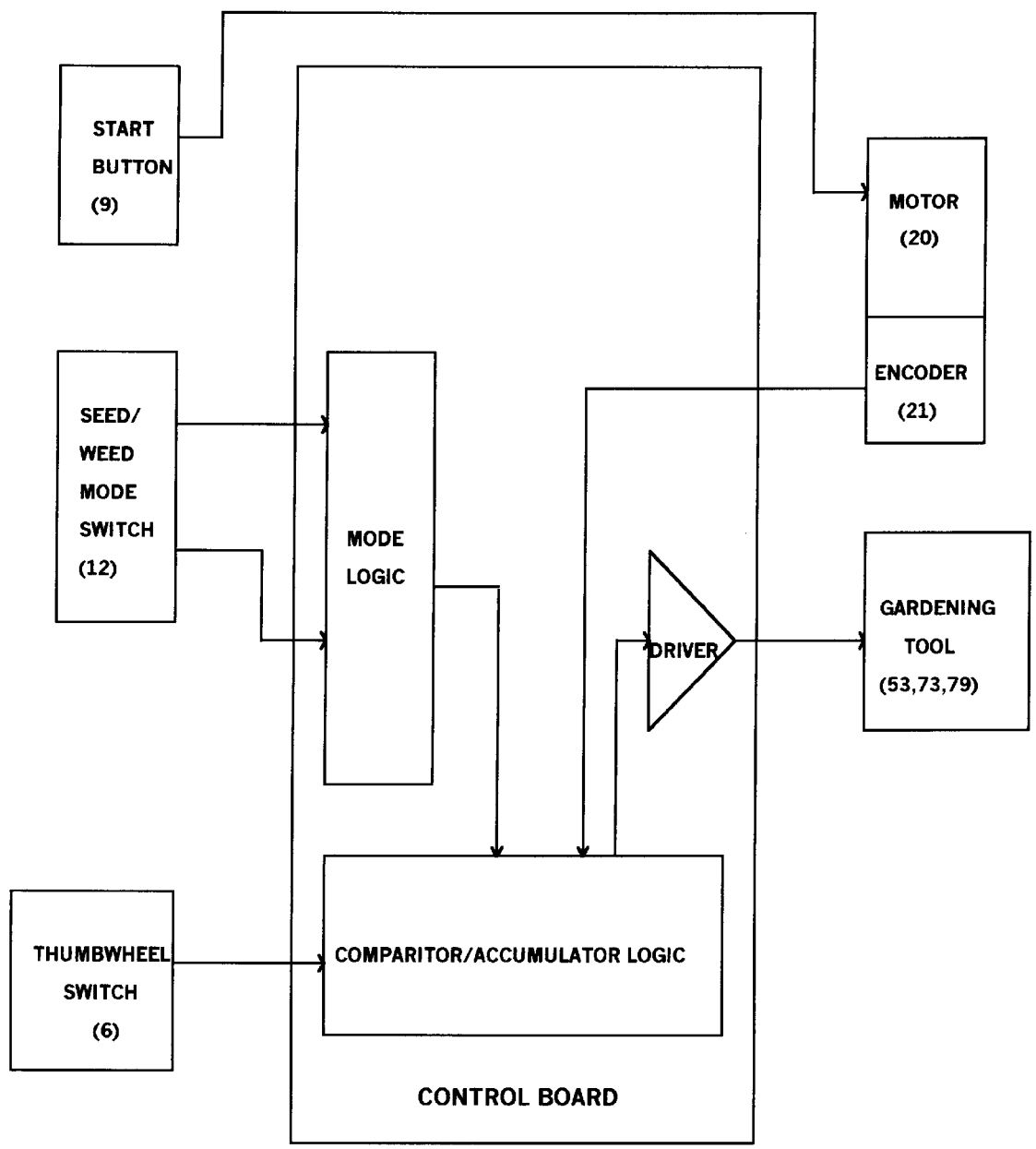
FIG 5. CONTROL CIRCUIT FUNCIONAL DIAGRAM

METHOD AND APPARATUS FOR PRECISION PLANTING, WEEDING, AND CULTIVATION OF CROPS/ A METRIC WALKING TRACTOR

BACKGROUND

Tools to facilitate small and medium gardening process are as old as man's first attempts to develop an agricultural society and are abundant in number such as an electric power small tractor U.S. Pat. No. 5,743,347 April 1998, Gingerich is directed towards independent control of the drive wheels and an oscillating powered cultivator U.S. Pat. No. 4,351,396 September 1982, Moulton which addresses the type of movement of a cultivator for use between the plant rows, or prior to planting. None of these or other studied inventions attempt to quantify, control or coordinate tool activities in relation to the incremental forward movement of the tractor. Consequently a machine would prove useful and desired to perform tasks which have heretofore only been accomplishable by human hands or possibly in some instances, toxic chemicals.

These tasks can be accomplished by providing a stable frame, motor and control circuitry to supply electromechanical energy and forward, repeatable movement with a universal mounting tool hitch which can accommodate a wide range of tools.

The actual tools can be of a traditional nature for proven tasks such as plowing and cultivating, while more sophisticated appliances can be incorporated for controlled planting, weeding and even fertilizing within very close proximity to the growing plants. These qualities make the apparatus very useful where much hand work has previously been necessary in home gardens and truck farms.

BRIEF SUMMARY OF THE INVENTION

The instant invention is particularly intended for gardening and small truck farming operations consisting of a method and apparatus which provides for accurate planting of seed in rows and is, by this embodiment, able to repeat it's travel in the row to perform subsequent tasks such as in-the-row weeding, cultivating and other operations as desired. To achieve these goals, the machine is comprised of a solid frame, encoded motor, batteries, direct coupled worm drive, high traction wheels, drive and control circuitry and universal tool holder with electromechanical power available to the ground conditioning tools as needed. The named machine is also constructed to incorporate traditional tools such as plows, cultivators, weed scrapers and more. To further enhance the usability of the apparatus, an on-board solar panel is included with a special drive circuit which can switch the batteries from parrallel for charging to series for running the motor and control circuit.

BRIEF DESCRIPTION OF DRAWINGS

FIG. 4 is a schematic of the motor drive/solar charging electric switching system.

FIG. 5 is a functional diagram of the control circuit.

DETAILED DESCRIPTION OF THE PREFERRED EMBODIMENT OF THE INVENTION

Figure 1:
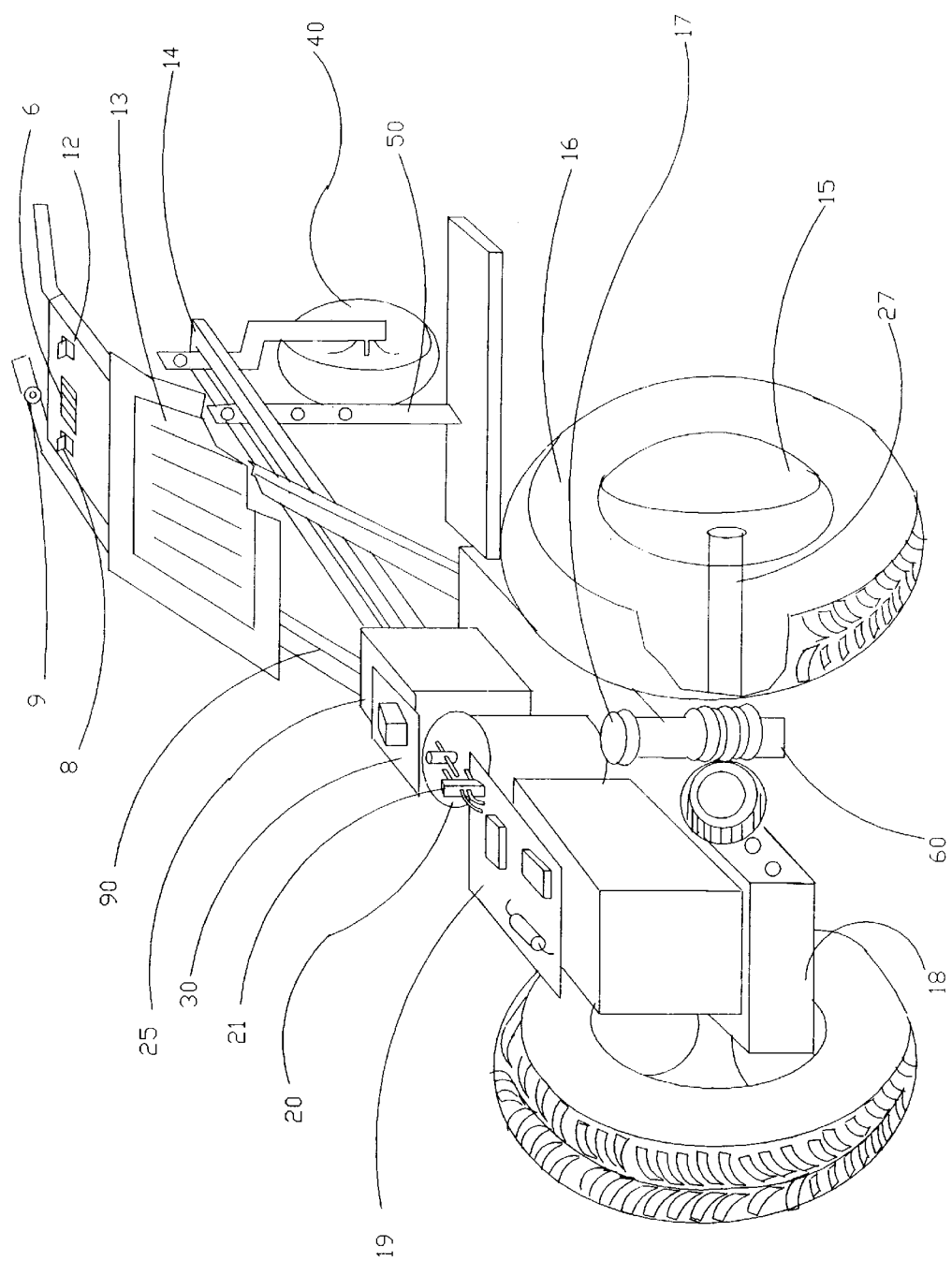
FIG. 1 is a perspective layout drawing of the first embodiment of the invention.

Referring to FIG. 1 for an overall view of one embodiment of the instant invention it may be seen that the apparatus comprises a metal frame 18 that supports the motor 20, batteries 24 and 25, control electronics 19, drive electronics 30, handle assembly 90 and gearbox assembly 60. Where-upon the photo-optic detector 21 senses the revolutions of the motor and sends a number of pulses to the control circuit 19 which translates number of pulses to a specific forward incremental movement of the apparatus (tractor). By allowing the operator to preset a distance between plants for seeding and the spacing between plants for weeding by setting thumbwheel switch 6, both processes can be accomplished with great accuracy. Switch 12 sets and resets the counters to perform in either the seed or weed mode with center off. In any case the operation of both the motor drive and the tool operation is set on or off with the momentary switch 9 which only starts and stops the total movements without setting or resetting the tool operation. Switch 8 is a combination disconnect and current overload protector.

In cooperation with the activity of the apparatus, the solar panel 13 will charge the batteries anytime the motor is not running by virtue of the drive electronics 30 which switches the batteries in series for running the motor and in parallel for recharging.

Figure 3:
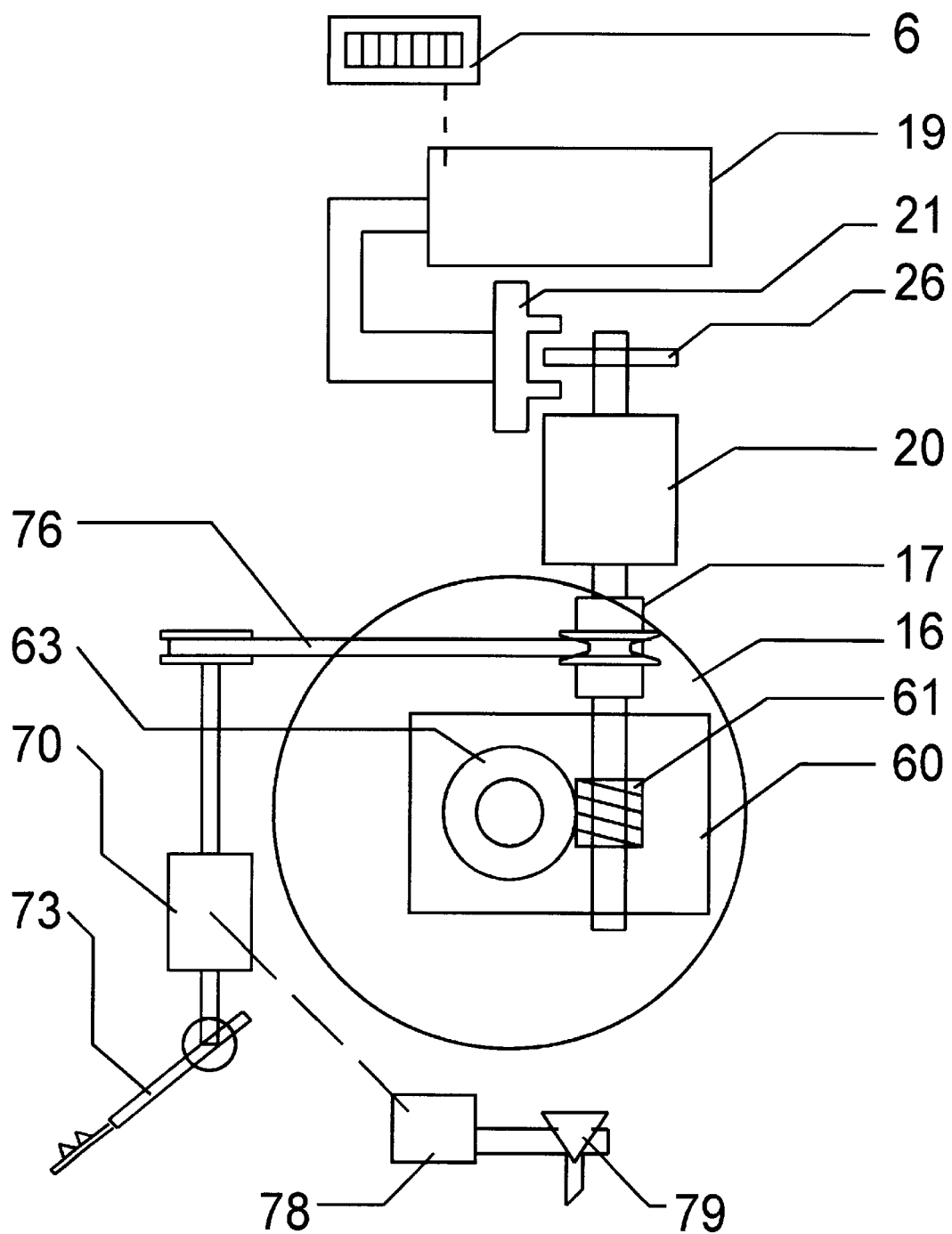
FIG. 3 is a functional diagram of the metric drive system with some attachments.

The universal tool bar 14 can accommodate a variety of conventional tools such as the weed scraper 50 or other customized electromechanical gardening tools such as those described in FIG. 3. The tool bar 14 also provides for a depth control wheel 40 which can be set to different depths depending on the tool and application. High traction tires 16 are incorporated in this instant embodiment to insure that a minimum of slippage occurs during metered processes.

Figure 2:
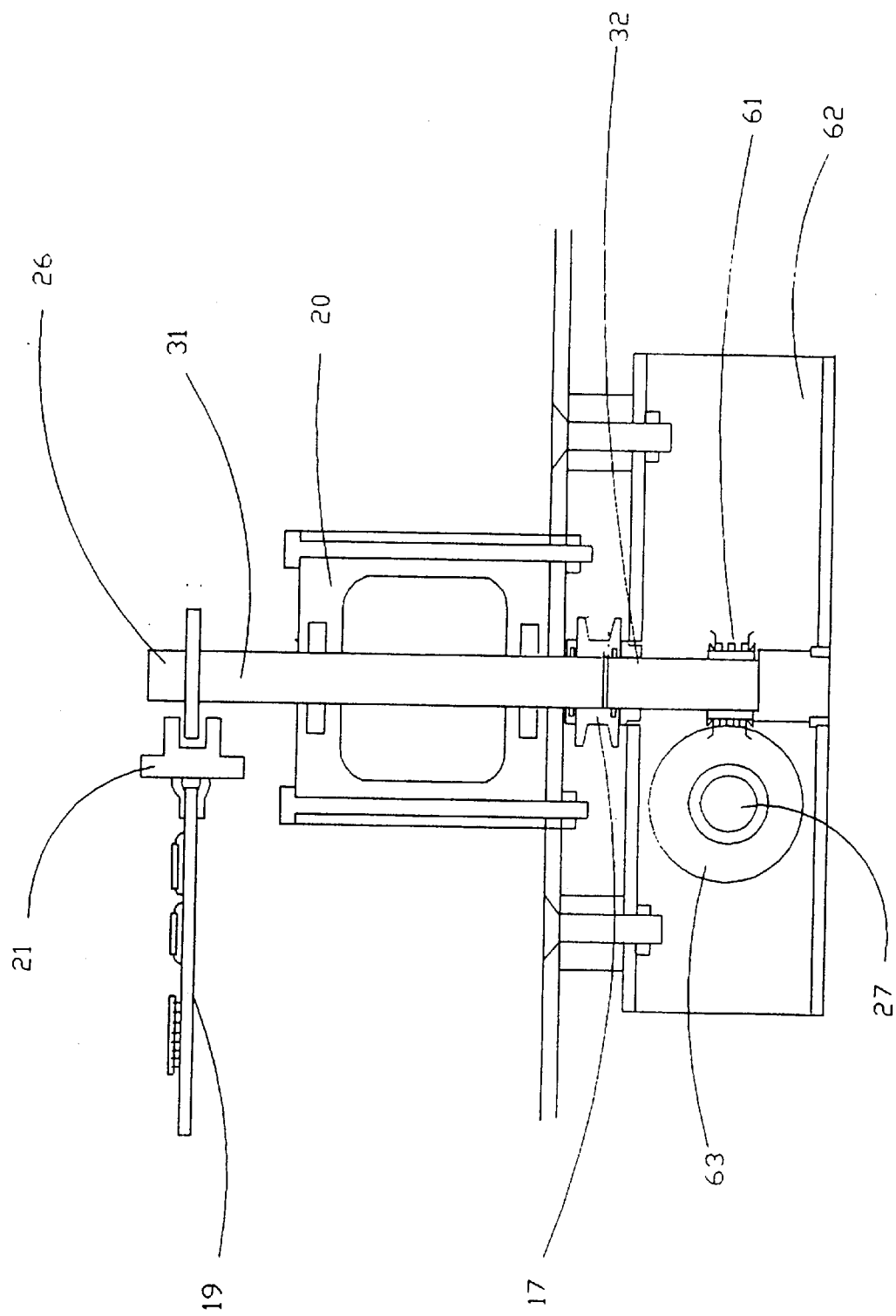
FIG. 2 is a sectional view of the gearbox and indexing system.

Referring to FIG. 2, for a sectional view of the gearbox drive and indexing mechanisms which include the motor 20, motor shaft 31, worm gear shaft 32, encoder 26, optic switch 21, control circuit 19, coupler/drive pulley 17, gear drive frame 62, worm gear 61 and drive gear 63 which drives the output shaft 27, it can be seen that there is a fixed relationship between the number of motor revolutions and the forward distance traveled by the tractor and those motor revolutions can be counted and translated into a predictable forward distance which can then be compared to a predetermined setting to switch certain electromechanical gardening tools on or off as required.

FIG. 3 provides us with a functional diagram of the metric drive system which shows how the motor 20 and gearbox 60 through worm 61 and gear 63 act in unison to drive the tractor forward while the control circuit 19 records the forward progress and actuates either a seeder 79 via it's electromechanical control unit 78 or a weeder 73 via it's electromechanical control 70 as dictated by the control circuit according to the settings of the thumbwheel switch 6. The mechanical drive link 76 provides power to the tools as required. FIG. 5 shows how the control circuit 19 monitors the thumbwheel switch 6, optic sensor 21 and seed/weed switch, 12 to provide the synchronized output for an attached tool depending on whether effort is required at or between the plant.

I claim:

1. A gardening machine which accurately positions tools for planting, cultivating and weeding directly in a row comprising:

a frame to support a handle, motor, batteries, gearbox and tool bar;

a control circuit linked to a motor encoder to provide a desired output to a selected gardening tool as a function of a forward location from a reference position of the gardening machine along the row wherein a number of revolutions of the motor is counted and wherein a forward distance traveled by the gardening machine is measured and translated into a predictable forward distance which is compared to a predetermined setting to engage garden tools as required;

a gearbox linked to the motor to provide drive directly to gardening machine wheels;

a universal tool bar to attach tools to the gardening machine;

a solar panel attached to the gardening machine to charge the batteries when not in use.

2. The gardening machine in claim 1 further comprising electromechanical power to the tool bar for ground or vegetation conditioning tools.

3. The gardening machine of claim 1 further comprising drive control circuitry whereby the batteries operate in series for running and in parallel for charging.

* * * * *